United States Patent [19]

Mikajiri

[11] 4,213,688
[45] Jul. 22, 1980

[54] AUTOMATIC EXPOSURE TIME CONTROL APPARATUS FOR CAMERA

[75] Inventor: Kazukichi Mikajiri, Yokohama, Japan

[73] Assignee: Canon Kabushiki Kaisha, Tokyo, Japan

[21] Appl. No.: 19,110

[22] Filed: Mar. 9, 1979

[30] Foreign Application Priority Data

Mar. 16, 1978 [JP] Japan .................................. 53-30144

[51] Int. Cl.² ........................ G03B 7/00; H03K 21/36
[52] U.S. Cl. .................................. 354/23 D; 354/50; 354/60 A; 328/129
[58] Field of Search .............. 354/23 D, 50, 51, 60 A; 328/129; 307/271, 293

[56] References Cited

U.S. PATENT DOCUMENTS

| | | | |
|---|---|---|---|
| 3,037,166 | 5/1962 | Alexander | 328/129 |
| 3,868,704 | 2/1975 | Yamada et al. | 354/50 |
| 3,995,284 | 11/1976 | Kitaura et al. | 354/23 D |
| 4,037,233 | 7/1977 | Shinoda | 354/23 D |

*Primary Examiner*—Donald A. Griffin
*Assistant Examiner*—William B. Perkey
*Attorney, Agent, or Firm*—Toren, McGeady and Stanger

[57] ABSTRACT

An automatic exposure time control apparatus for use with a camera having a shutter is disclosed. The apparatus includes a pulse generating circuit for producing pulses having a frequency corresponding to a base time, a counter for counting the pulses from the pulse generating circuit at the time of the opening of the shutter, a multiplying circuit for multiplying the product of the integral part n with $2^n$ by the decimal part b of the exposure time value, a shutter driving device and a control circuit. The control circuit detects the existence of the decimal part so as to deliver the shutter closing signal to the shutter driving device when the counter has counted $2^n$ pulses when the decimal part does not exist and to deliver the shutter closing signal after lapse of the sum of the above-mentioned count time with the time during which one or another counter counts the number corresponding to the output of the multiplying circuit of the pulses of the period corresponding to 1/a of the aforementioned pulses when the decimal part exists.

16 Claims, 6 Drawing Figures

| EXPOSURE TIME VALUS T (sec) | CONTENTS OF COUNTER C & REGISTER R | | | | | | | |
|---|---|---|---|---|---|---|---|---|
| | GIN | FIN | EIN | DIN | CIN | BIN | AIN | XIN |
| 1/11.3 | 1 | 0 | 0 | 0 | 0 | 0 | 0 | 1 |
| 1/16 | 1 | 0 | 0 | 0 | 0 | 0 | 0 | 0 |
| 1/22.6 | 0 | 1 | 0 | 0 | 0 | 0 | 0 | 1 |
| 1/32 | 0 | 1 | 0 | 0 | 0 | 0 | 0 | 0 |
| 1/45.2 | 0 | 0 | 1 | 0 | 0 | 0 | 0 | 1 |
| 1/64 | 0 | 0 | 1 | 0 | 0 | 0 | 0 | 0 |
| 1/90.5 | 0 | 0 | 0 | 1 | 0 | 0 | 0 | 1 |
| 1/128 | 0 | 0 | 0 | 1 | 0 | 0 | 0 | 0 |
| 1/181 | 0 | 0 | 0 | 0 | 1 | 0 | 0 | 1 |
| 1/256 | 0 | 0 | 0 | 0 | 1 | 0 | 0 | 0 |
| 1/362 | 0 | 0 | 0 | 0 | 0 | 1 | 0 | 1 |
| 1/512 | 0 | 0 | 0 | 0 | 0 | 1 | 0 | 0 |
| 1/724 | 0 | 0 | 0 | 0 | 0 | 0 | 1 | 1 |
| 1/1024 | 0 | 0 | 0 | 0 | 0 | 0 | 1 | 0 |

| EXPOSURE TIME T (sec) | PRESET VALUE IN COUNTER C1 | | | | | | | PRESET VALUE IN COUNTER C2 | | | | | | | |
|---|---|---|---|---|---|---|---|---|---|---|---|---|---|---|---|
| | GIN | FIN | EIN | DIN | CIN | BIN | AIN | TIN | SIN | RIN | QIN | PIN | OIN | NIN | MIN |
| 1/16 | 1 | 0 | 0 | 0 | 0 | 0 | 0 | 0 | 0 | 0 | 0 | 0 | 0 | 0 | 0 |
| 1/17.4 | 0 | 1 | 0 | 0 | 0 | 0 | 0 | 1 | 1 | 1 | 0 | 0 | 0 | 0 | 0 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 1/256 | 0 | 0 | 0 | 0 | 1 | 0 | 0 | 0 | 0 | 0 | 0 | 0 | 0 | 0 | 0 |
| 1/279 | 0 | 0 | 0 | 0 | 0 | 1 | 0 | 0 | 0 | 0 | 0 | 1 | 1 | 1 | 0 |
| 1/304 | 0 | 0 | 0 | 0 | 0 | 1 | 0 | 0 | 0 | 0 | 0 | 1 | 1 | 0 | 0 |
| 1/332 | 0 | 0 | 0 | 0 | 0 | 1 | 0 | 0 | 0 | 0 | 0 | 1 | 0 | 1 | 0 |
| 1/362 | 0 | 0 | 0 | 0 | 0 | 1 | 0 | 0 | 0 | 0 | 0 | 1 | 0 | 0 | 0 |
| 1/395 | 0 | 0 | 0 | 0 | 0 | 1 | 0 | 0 | 0 | 0 | 0 | 0 | 1 | 1 | 0 |
| 1/430 | 0 | 0 | 0 | 0 | 0 | 1 | 0 | 0 | 0 | 0 | 0 | 0 | 1 | 0 | 0 |
| 1/470 | 0 | 0 | 0 | 0 | 0 | 1 | 0 | 0 | 0 | 0 | 0 | 0 | 0 | 1 | 0 |
| 1/512 | 0 | 0 | 0 | 0 | 0 | 1 | 0 | 0 | 0 | 0 | 0 | 0 | 0 | 0 | 0 |
| 1/558 | 0 | 0 | 0 | 0 | 0 | 0 | 1 | 0 | 0 | 0 | 0 | 0 | 1 | 1 | 1 |
| 1/609 | 0 | 0 | 0 | 0 | 0 | 0 | 1 | 0 | 0 | 0 | 0 | 0 | 1 | 1 | 0 |
| 1/661 | 0 | 0 | 0 | 0 | 0 | 0 | 1 | 0 | 0 | 0 | 0 | 0 | 1 | 0 | 1 |
| 1/724 | 0 | 0 | 0 | 0 | 0 | 0 | 1 | 0 | 0 | 0 | 0 | 0 | 1 | 0 | 0 |
| 1/789 | 0 | 0 | 0 | 0 | 0 | 0 | 1 | 0 | 0 | 0 | 0 | 0 | 0 | 1 | 1 |
| 1/861 | 0 | 0 | 0 | 0 | 0 | 0 | 1 | 0 | 0 | 0 | 0 | 0 | 0 | 1 | 0 |
| 1/939 | 0 | 0 | 0 | 0 | 0 | 0 | 1 | 0 | 0 | 0 | 0 | 0 | 0 | 0 | 1 |
| 1/1024 | 0 | 0 | 0 | 0 | 0 | 0 | 1 | 0 | 0 | 0 | 0 | 0 | 0 | 0 | 0 |

AUTOMATIC EXPOSURE TIME CONTROL APPARATUS FOR CAMERA

BACKGROUND OF THE INVENTION

1. Field of the Invention

The present invention relates to an automatic exposure time control apparatus for a camera, particularly for reproducing the exposure time value stored as a digital value in the memory as the actual time.

2. Description of the Prior Art

Quite recently, many devices have been proposed in which the exposure time value is stored as a digital value and read out at the time of shutter opening in order to improve the exposure accuracy. In most of these devices, the shutter time values such as 1/1000 seconds, 1/500 seconds, 1/250 seconds, and so on, have values which are half of the next value which are stored as a digital value and are reproduced by making use of the count time of a binary counter. One of the most recently proposed devices is so designed that the shutter time values, one of which is one third ($\frac{1}{3}$) or one fourth ($\frac{1}{4}$) of the following value, are stored as a digital value and reproduced as the actual value in order to keep the reproducing error below 1/6 or 1/18. Such arrangement is disclosed in U.S. Pat. No. 3,995,284 (issued Nov. 30, 1976).

The exposure time reproducing method of the above automatic exposure time control apparatus is as follows. A digital signal (hereinafter called the decimal part of the exposure time value) of the exposure time value, which is smaller than one step of the value converted into digital value, is determined in such a manner that, for example, if the exposure time is controlled each by $\frac{1}{3}$ step, one of the f (frequency), f (frequency)$\times 2^{\frac{1}{3}}$ or f$\times 2^{\frac{2}{3}}$ is selected. The counting is carried out with the selected frequency as often as the number corresponding to the digital signal (hereinafter called the integral part of the exposure time value) representing the exposure time value for each one step so as to reproduce the exposure time. That is, in the case of the above automatic exposure time control apparatus, a reading out pulse signal with a certain specified frequency is provided in such a manner that the counting is carried out n times by making use of this reading out of pulses so as to reproduce the exposure time value. However, as mentioned above, it is necessary for the above automatic exposure time control apparatus to produce pulses with a certain specified frequency such as f$\times 2^{\frac{1}{3}}$ or f$\times 2^{\frac{2}{3}}$, which is very difficult to produce. Accordingly, in this conventional device, a complicated circuit composition is needed.

SUMMARY OF THE INVENTION

A purpose of the present invention is to provide an automatic exposure time control apparatus eliminating the shortcomings of the conventional apparatus in producing pulses with frequencies such as f$\times 2^{\frac{1}{3}}$ or f$\times 2^{\frac{2}{3}}$.

A principal feature of the present invention resides in the fact that the counting is carried out $2^n$ times with the reading out pulse signal having the first frequency which can easily be produced. Then, the counting is carried out $2^n \cdot b$ times with the reading out pulse signal having the second frequency which can easily be produced. Accordingly, the exposure time with the sum of the time spent for the above two countings can readily be provided.

In accordance with the invention, an automatic exposure time control apparatus for a camera, wherein the exposure time has an integral part and a decimal part, comprises first pulse generating means for producing a first train of pulses having a certain determined frequency, second pulse generating means for producing a second train of pulses having a certain determined frequency relative to the content of the decimal part of the exposure time and pulse counting means for counting pulses. Also included are means for supplying the first pulse train to the pulse counting means and the second pulse train to the second pulse train counting means at a subsequent time interval, means for initiating counting of pulses from the first pulse train by the pulse counting means when the exposure is initiated, and control means for terminating the exposure when the pulse counting means has counted $2^n$ pulses relative to the content of the integral part of the exposure time coming from the first pulse generating means and $2^n \cdot b$ pulses relative to the content of the decimal part of the exposure time coming from the second pulse generating means at the subsequent time interval.

For a better understanding of the present invention, reference is made to the following description and accompanying drawings, while the scope of the present invention will be pointed out in the appended claims.

DESCRIPTION OF THE PREFERRED EMBODIMENTS

Before the embodiments of the present invention are described in accordance with the accompanying drawings, the principle of the invention will be explained.

Generally, the exposure time value T is represented as follows:

$$T = Tst \times 2^n \times 2^{b/a} \tag{1}$$

Tst is the shortest exposure time such as 1/1000 seconds; $2^n$ is the content of the integral number part of the above-mentioned exposure value; $2^{b/a}$ is the content of the decimal part of the above-mentioned exposure value, for example, $\frac{1}{2}$ or 0/2 when the exposure time is stepped by $\frac{1}{2}$, or $\frac{1}{3}$, $\frac{2}{3}$ or 0/3 when the exposure time is stepped by $\frac{1}{3}$. Further, $n = b = 0, 1, 2 \ldots$ while $a = 1, 2, \ldots$.

As in the case of the above-mentioned conventional example, the exposure time value T is determined by multiplying the base time Tst by $2^{b/a}$ and then by $2^n$. In accordance with this method, as mentioned above, in order to obtain pulses having a frequency of Tst$\times 2^{b/a}$, it is necessary to provide a plural number of ring counters or a set of oscillators for producing pulses with a frequency Tst $2^{b/a}$, which is inconvenient. In accordance with the present invention, the $2^{b/a}$ of the above-mentioned relation (1) is represented as follows:

$$2^{b/a} = (1+b/a) \qquad (2)$$

Namely, $$T = Tst \cdot 2^n \cdot 2^{\frac{b}{a}} \approx Tst \cdot 2^n (1 + \frac{b}{a}) = Tst \cdot 2^n + \frac{Tst}{a} 2^n \cdot b \qquad (3)$$

That is, the base time Tst is multiplied by $2^n$ in such a manner that the exposure time is reproduced by making use of the calculation time. When the exposure time value T cannot be represented by $Tst \cdot 2^n$, the pulses with frequency $Tst/a$ are multiplied with $2^n \times b$ so that the exposure time is reproduced by making use of the sum of the above-mentioned calculation time with the second calculation time.

The exposure time attained in accordance with the present invention is as follows:

When $$Tst = \frac{1}{1024} \text{ (S)}, 2^n = 2^4, 2^{\frac{b}{a}} = 2^{\frac{3}{4}}$$

when the exposure time is stepped by $\frac{1}{4}$, that is, when the exposure time value T cannot be represented by $Tst \cdot 2^n$, the actual exposure time value To is represented as follows:

$$To = Tst \cdot 2^n \cdot 2^{\frac{b}{a}} = Tst \cdot 2^4 \cdot 2^{\frac{3}{4}} \approx \frac{1}{1024} \times 16 \times 1.6817909 \approx$$

$$0.0262779 \text{(seconds)} \approx \frac{1}{38.05} \text{ (seconds)},$$

while in accordance with the present invention, the exposure time value T is represented as follows:

$$T = Tst \cdot 2^n + \frac{Tst}{a} \cdot 2^n \cdot b = \frac{2^4}{1024} + \frac{1}{4 \times 1024} \cdot 2^4 \cdot 3 \approx$$

$$0.015625 + 0.0117187 \approx 0.0273437 \text{(seconds)} = \frac{1}{36.57} \text{ (seconds)}$$

The error in this case is 4.055(%).
Further, when $$Tst = \frac{1}{1024} \text{ (seconds)}, 2^n = 2^4, 2^{\frac{b}{a}} = 2^{\frac{5}{8}}$$

when the exposure time is stepped by $\frac{3}{8}$, the actual exposure time value $T_o$ is represented as follows:

$$T_o = Tst \cdot 2^n \cdot 2^{\frac{b}{a}} = Tst \cdot 2^4 \cdot 2^{\frac{5}{8}} \approx \frac{1}{1024} \times 16 \times 1.8340061 \approx$$

$$0.0286563 \approx \frac{1}{34.896} \text{ (seconds)}$$

while in accordance with the present invention, the exposure time value T is represented as follows:

$$T = Tst \cdot 2^n + \frac{Tst}{a} \cdot 2^n \cdot b = \frac{2^4}{1026} + \frac{1}{8 \times 1024} \cdot 2^4 \cdot 7 \approx$$

$$0.015625 + 0.0136718 \approx 0.0292968 \text{(seconds)} \approx$$

$$\frac{1}{34.13342} \text{ (seconds)}$$

In this case, the error is about 2.235(%).

Further, when $$Tst = \frac{1}{1024} \text{ (seconds)}, 2^n = 2^4, 2^{\frac{b}{a}} = 2^{\frac{2}{4}}$$

when the exposure time is stepped with $\frac{1}{4}$, the actual exposure time value $T_o$ is represented as follows:

$$T_o = Tst \cdot 2^n \cdot 2^{\frac{b}{a}} = Tst \cdot 2^4 \cdot 2^{\frac{2}{4}} \approx \frac{1}{1024} \times 16 \times$$

$$1.41421356 \approx 0.022097 \approx \frac{1}{45.2} \text{ (seconds)},$$

while in the case of the present invention, the exposure time T is represented as follows:

$$T = Tst \cdot 2^n + \frac{Tst}{a} \cdot 2^n \cdot b = \frac{16}{1024} + \frac{1}{4 \times 1024} \times 16 \times 2 \approx$$

$$0.015625 + 0.0078125 \approx 0.0234375 \approx \frac{1}{42.66} \text{ (seconds)}$$

Thus, the error is about 6.06643(%). These errors do not cause any problem in practice, as is well known.

Below, an embodiment of the present invention in accordance with the above-mentioned principle will be explained in accordance with the accompanying drawings.

Figure 1:
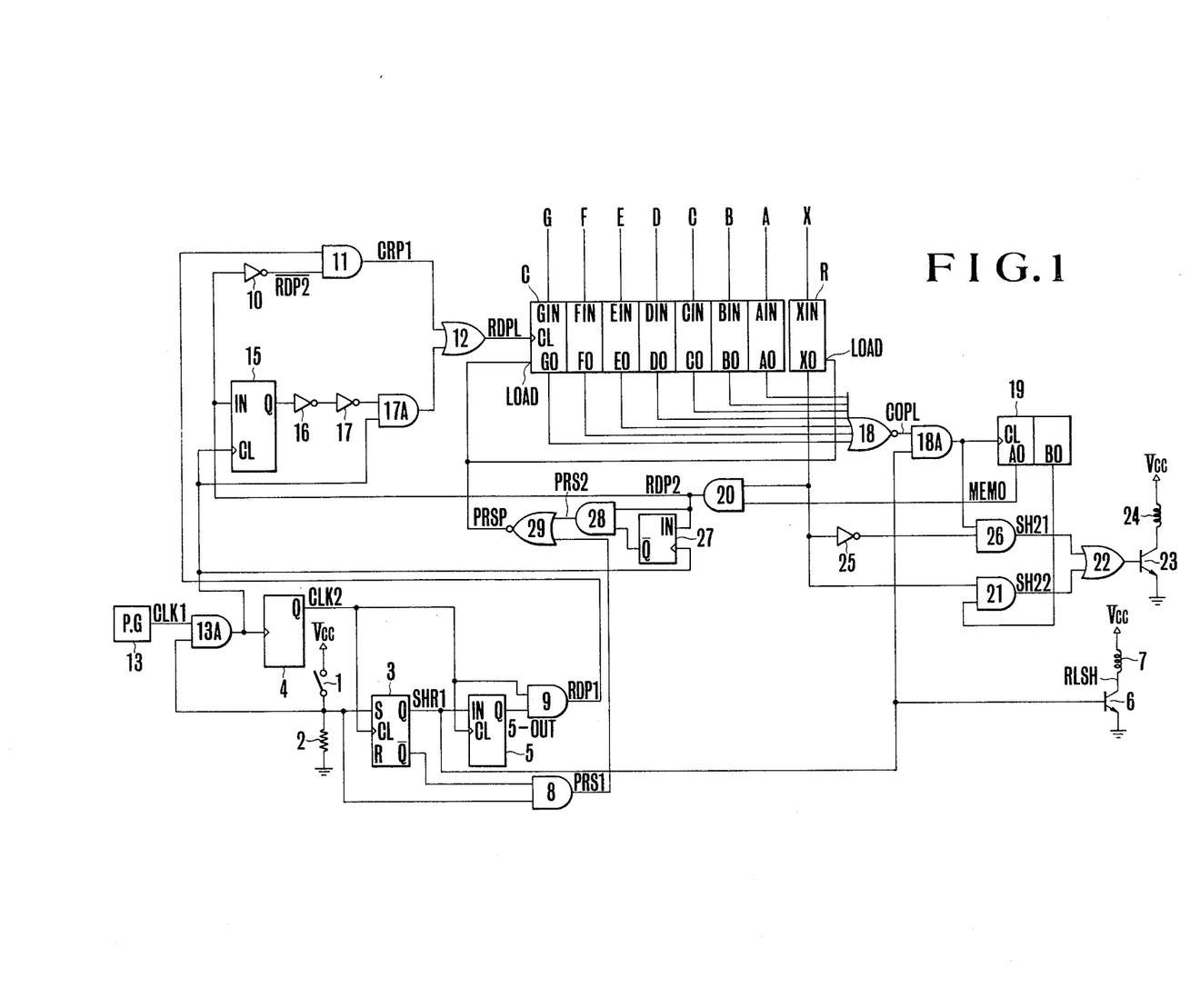
FIG. 1 shows the circuit diagram of the first embodiment.

FIG. 1 shows an embodiment of a single lens reflex camera to which the automatic exposure time control apparatus in accordance with the present invention applies, where the exposure time is stepped by $\frac{1}{4}$.

In FIG. 1, element 1 is a normally-open type release switch operatively engaged with the shutter release button (not shown in the drawing) so as to be closed with the second stroke of the release button. Element 2 is a resistance connected to the low voltage power source Vcc through the switch 1. The output terminal of this resistance 2 is connected to the set input terminal of the R-S flip-flop (hereinafter called R-S FF) 3. To the clock input terminal CL of the R-S FF3, the output terminal Q of the T flip-flop (hereinafter called TFF) 4 is connected. One output terminal Q of R-S FF3 is connected to the input terminal of D flip-flop (DFF) 5 and also to the base of the npn transistor 6 which is connected to the coil 7 of the shutter leading curtain control magnet. Further, in order to synchronize the start of the shutter leading curtain (not shown in the drawing) with that of the counting, the other output terminal $\overline{Q}$ of the R-S FF3 is connected to one input terminal of the shutter speed preset AND gate 8. Further, the other input terminal of the AND gate 8 is connected to the resistance 2. The clock input terminal CL of DFF5 is connected to the output terminal Q of TFF4. The output terminal Q of DFF5 is connected to the count input terminal CL of the presettable up-down counter C through the AND gates 9, 11 and the OR gate 12. The DFF5 and the AND gate 9 are provided to prevent the start of counting by the counter C at the same time as the start of the shutter leading curtain.

Element 13 is a clock pulse oscillator (hereinafter called PG) for producing pulses, in the case of the present embodiment, of the period 1/2048 (seconds), namely, Tst/a in equation (3) is equal to Tst/2. Consequently, a train of pulses with a period 1/1024 (seconds) is produced since element 4 is a TFF.

Element 10 is an inverter, while element 15 is a DFF. The clock input terminal CL is connected to the output terminal of PG 13 through the AND gate 13A, while the output terminal is connected to one input terminal of the OR gate 12 through the two inverters 16 and 17 and the AND gate 17A in order to timely preset the counter. The counter input terminal CL of the above-mentioned 7 bit counter C, which is constructed to operate as a down counter, is connected to the output terminal of the read-out frequency change-over circuit which is composed of elements 10–12, 15–17, 17A. On each of the least bit AIN (hereinafter called LSB), the following bits BIN, CIN, EIN, FIN and the maximum bit GIN (MSB) of the counter C, $2^n$, in the aforementioned exposure time T can be preset. Further, each of the output terminals AO-GO of the counter C is connected to the NOR gate 18 for detecting when the content of the counter C is at null.

R is the register for storing $2^n \cdot b$ of the aforementioned exposure time, having an input terminal XIN and output terminal XO. It is necessary to provide a circuit for multiplying the content of C with b times (for example, 2 or 1 when the exposure time is stepped by $\frac{1}{3}$) in accordance with the content of the register R. However, in the present embodiment where the exposure time is stepped by $\frac{1}{2}$, only the circuit for multiplying the content of the counter C and no circuit for multiplying the content of the counter C by 2 or 3 is shown.

Further, in FIG. 1, element 19 is the 2 bit binary counter for memorizing the termination of the reading out of the content of the counter C, AO which is the LSB, constitutes a circuit for multiplying the content of the integral part of the exposure time by 1, being connected to the input terminal of the AND gate 20 for generating the change-over signal for the above-mentioned reading out frequency change-over circuit, and BO, which is the MSB, is connected to the base of the shutter trailing curtain control transistor 23 through the AND gate 21 and the OR gate 22. 24 is the coil of the shutter trailing curtain control magnet, 25 is the inverter, 26 is the AND gate, 27–28 are the DFF AND gate and NOR gate for constituting a circuit for multiplying the content of the counter by 1, whereby the output terminal of the NOR gate 29 is connected to the LOAD terminal of the counter C acting as the preset enable terminal.

Figure 2:
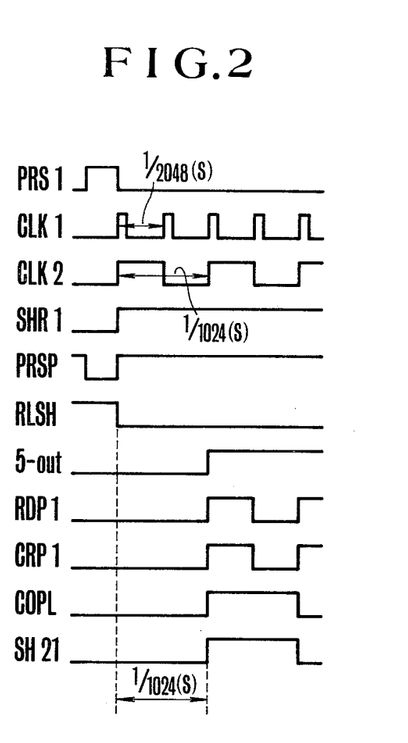
FIGS. 2 and 3, respectively, show a timing chart of the waveforms at various parts of the shutter time reproducing device shown in FIG. 1.

Below, the operation of the exposure time control apparatus for the single lens reflex camera, composed as mentioned above, will be explained in accordance with FIGS. 2 and 4. First, the case where the decimal part does not exist for the exposure time will be explained, that is, the case where $b=0$ and the exposure time T to be reproduced is Tst·$2^n$. When the release button (not shown) is operated, the content of each flip-flop, the register and the counter is reset. When, then, the release button is further pushed down so as to close the switch, the level at the output terminal of the AND gate 8 becomes high ("1") because the level at the output terminal $\overline{Q}$ of R-SFF3 is high so as to deliver an exposure time preset signal PRS1, as is shown in FIG. 2, to the NOR gate 29. The signal PRS1 is, thus, inverted into the signal PRSP, as is shown in FIG. 2, so as to be delivered to the LOAD terminal LOAD of the counter C. When the low level signal PRSP ("0") is delivered to the counter C and the LOAD terminal of the register 4, the digital signal corresponding to the exposure time to be reproduced is preset in the counter C and the register R.

Figure 4:
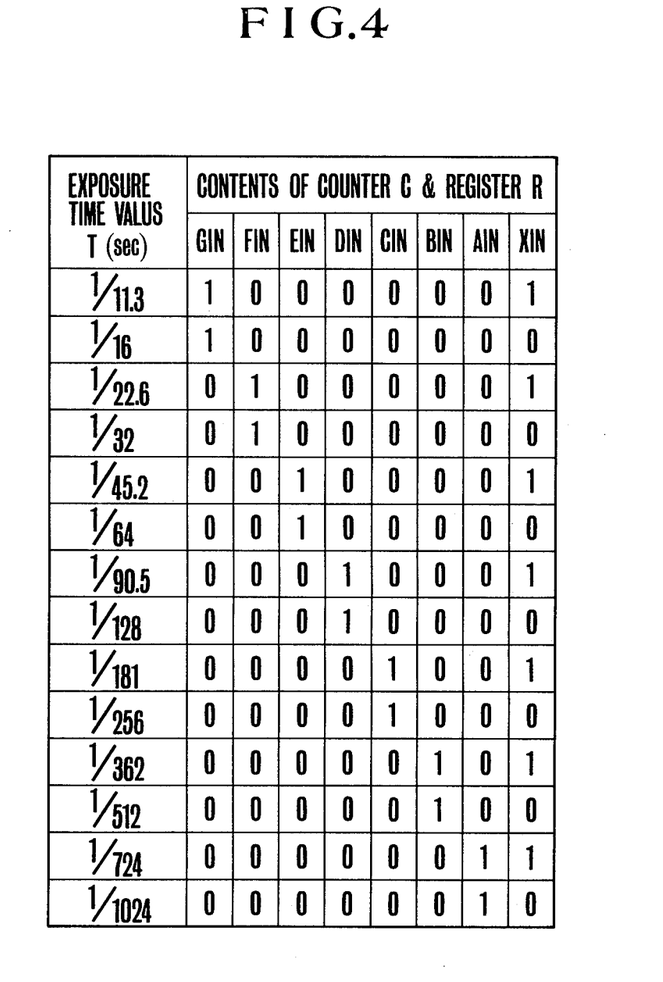
FIG. 4 shows the correspondence of each shutter time to the contents of the counter C and the register R.

Now, assuming that the exposure time manually set or stored in the memory circuit (not shown) is 1/1024 (seconds), (00000010) is preset in the counter C and the bits of the register R, as is shown in FIG. 4. After the exposure time has been preset as has been explained, TFF4 is triggered by means of the clock pulse CLK1 (FIG. 2) produced by means of PG13 in such a manner that when the clock pulse CLK2 (FIG. 2) is produced by means of TFF4 so as to set R-SFF3, a "1" is produced at the output terminal of FF3. When the signal SHR1 is delivered to the base of the transistor 6 in this way, the transistor 6 is brought out of the non-conductive state into the conductive state. A current then flows through the coil 7 of the shutter leading curtain holding magnet so as to release the shutter leading curtain (not shown in the drawing) and start the exposure.

On the other hand, when R-SFF3 is inverted by means of CLK2, as has been explained above, the output of AND gate 8 becomes "0" so that, at the same time with the start of the shutter leading curtain, the exposure time has been preset in the counter C and the register R. The output at the output terminal Q of TFF4, after lapse of 1/1024 (seconds) after the opening of the shutter, is inverted from "0" to "1". DFF5 is triggered in such a manner that the output at the output terminal Q of DFF5 is inverted from "0" to "1", as is shown in FIG. 2, so that the output at the output terminal of the AND gate 9 is inverted to "1", and the signal RDP1 is delivered at the input terminal of the AND gate 11. At this time, a "1" is delivered to the other input terminal of the AND gate 11 because "0" is preset in the register R. Accordingly, synchronized with the rising up of the signal RDP1, the output at the output terminal of the AND gate 11 becomes "1", while a reading out signal is delivered through the OR gate 12 to the count input terminal CL of the counter C. Consequently, the outputs at all of the output terminals GO-AO of the counter C become "0", while the output of the NOR gate 18 becomes "1" as is shown in COPL in FIG. 2. This is done in such a manner that a "1" is delivered to the first input terminal of the AND gate 26 through the AND gate 18A. To the second input terminal of the AND gate 26, a "1" (from the "0" preset in the register R) is delivered so that the output of the AND gate 26 is in synchronization with the signal COPL produced by the NOR gate 18 when the counter C has counted one pulse. This results in transistor 23 being brought into the switched-on state through the OR gate 22. Thus, the shutter trailing curtain starts to run after lapse of 1/1024 (seconds) after the start of the shutter leading curtain, as is shown in SH21 in FIG. 2, so as to complete the exposure. That is, the exposure time of 1/1024 (seconds) is reproduced.

Now, assume that an exposure time corresponding to 1/64 (seconds), namely (00100000), is preset in the counter C and the register R as is shown in FIG. 4. When the counter C has counted 16 reading pulses RDPL with a period 1/1024 (seconds), the output of the NOR gate 18, which constitutes a coincidence detection circuit, is inverted from "0" to "1", so that the shutter trailing curtain starts to run after 1/64 (seconds) (=1/1024 (seconds)×16) after the start of the shutter leading curtain so as to reproduce an exposure time of 1/64 (seconds).

Figure 3:
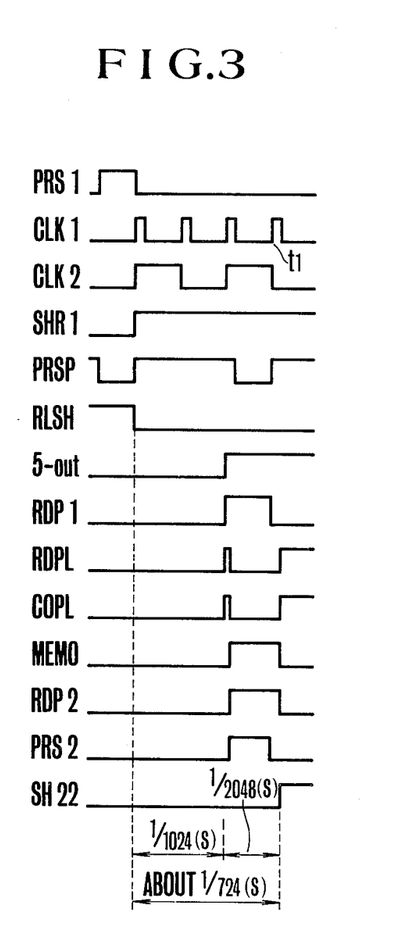

Below, the case where the exposure time has a decimal part, that is, $b=1$, will be considered where the exposure time value $$T = Tst \times 2^n + Tst/a \times 2^n \times b$$

is, for example, 1/724 (seconds), 1/362 (seconds), 1/181 (seconds) in FIG. 4. This explanation is in accordance with FIGS. 3 and 4.

As had been mentioned above, when the release button is pushed down to the second stroke and the preset signal PRS1 is produced with the AND gate 8, a digital signal corresponding to the exposure value to be reproduced is preset in the counter C and the register R. When the preset exposure time value is, for example, 1/724 (seconds), the content of the counter becomes (0000001), as is shown in FIG. 4, while the content of the register R becomes (1). When, then, TFF4 is triggered by means of CLK1 produced by means of PG13, and while the CLK2 is inverted out of "0" into "1", the shutter leading curtain starts to run, as has been explained, while the counter C and the register R have been preset. When, after lapse of 1/1024 (seconds) after the start of the shutter leading curtain, the signal CLK2 produced by means of TFF4 is again inverted from "0" to "1", the signal RDP1 of the AND gate 9 is inverted from "0" to "1" as is shown in FIG. 3. Because, at this time point, the NOR gate 18 is not producing the coincidence signal COPL, the output at the output terminal of the counter 19 remains "0" in such a manner that the AND gate delivers a "1" in synchronization with the signal RDP1 from the AND gate 9 (FIG. 3), while the output at the output terminal of the OR gate 12 becomes "1" (RDPL in FIG. 3).

Consequently, the counter C counts down to "0" by means of the reading out signal RDPL from the OR gate. Thus, the NOR gate 18 delivers a "1", as is shown in COPL in FIG. 3, while the inverter 25 delivers a "0" because the output of the register R is "0" so that the output at the output terminal of the AND gate 26 does not become "1". Accordingly, the shutter trailing curtain (not shown in the drawing) does not start to run. On the other hand, when the output signal COPL of the NOR gate 18 is inverted from "0" to "1", as is shown in FIG. 4, the output of the AND gate 18A becomes "1". The counter 19 then counts up so as to deliver a "1" as is shown in MEMO in FIG. 3.

Thus, the level at the output terminal of the AND gate 20 for detecting the state of the register R becomes "1", as is shown in RDP2 in FIG. 3, while the output of the AND gate 28 becomes "1" as is shown in PRS2 in FIG. 3.

When the output of the AND gate 28 becomes "1", the level at the preset LOAD terminal of the counter C is again inverted from a "1" to a "0" so that (0000001) corresponding to the exposure time $2^n \cdot b = 2^0 \cdot 1 = 1$ is again preset in the counter C in the same manner as mentioned above. Further, along with the inversion of the output of the AND gate 20 from a "0" to a "1", the output of the inverter 10 is inverted into a "0" so that the reading out signal RDPL from the OR gate 12 is inverted from a "1" to a "0" in a short time. When, at the time point $t_1$ (FIG. 3), the CLK1 is again inverted from a "0" to a "1" so as to invert the DFF27 so that the level at the output terminal $\overline{Q}$ becomes "0", the output of the AND gate 28 becomes "0", again as is shown in PRS2 in FIG. 3. Thus, the output of the NOR gate 28 is again inverted from a "0" to a "1" so as to complete the presetting of the counter.

On the other hand, the CLK1 is delivered to the DFF15 in the change-over circuit as a clock pulse so that the DFF15 is inverted at the same time with the inversion of the DFF27 so that the output terminal Q delivers a "1". However, the counter reading out signal from DFF15 is delivered to the count terminal CL of the counter through the two inverters 16 and 17, and the AND gate 17A and the OR gate 12. Accordingly, as is shown in RDPL in FIG. 3, after the counter C has been preset, the signal is delivered to the counter C as the second reading out pulse. When the reading out signal RDPL is delivered from the OR gate 12 to the counter C, the content of the counter C again becomes (0000000) so that the level at the output terminal of the NOR gate 18 is again inverted from a "0" to "1". The counter 19 then further counts up so that the output terminal BO delivers a "1", while the level at the output terminal of the AND gate 21 is inverted from a "0" to a "1", as is shown in SH22 in FIG. 3, so as to bring the transistor 23 into the switched-on state.

When the transistor 23 is brought into the switched-on state, the shutter trailing curtain holding magnet is excited in such a manner that the shutter trailing curtain starts to run after lapse of 1/683 (seconds) ($=1/1024+1/2048$) after the start of the shutter leading curtain to complete the exposure. That is, the shutter trailing curtain starts to run after lapse of a time nearly corresponding to the preset exposure time value so as to reproduce the exposure time value. Further, when the exposure time value is 1/45.2 (seconds), namely, (00100001) is preset in the counter C and the register R, as is shown in FIG. 4, at first the counter C counts the 16 reading out pulses RDPL with a period 1/1024 (seconds), the reading out frequency is changed over by means of the reading out frequency change-over circuit and then the counter C counts the 16 reading out pulses RDPL with a period 1/2048 (seconds). Accordingly, the AND gate 21 for the shutter trailing curtain delivers a "1". Thus, the shutter trailing curtain starts to run after 1/427 (seconds) ($=1/1024\times16+1/2048\times16$) so as to reproduce an exposure time nearly corresponding to the preset exposure time.

Figure 5:
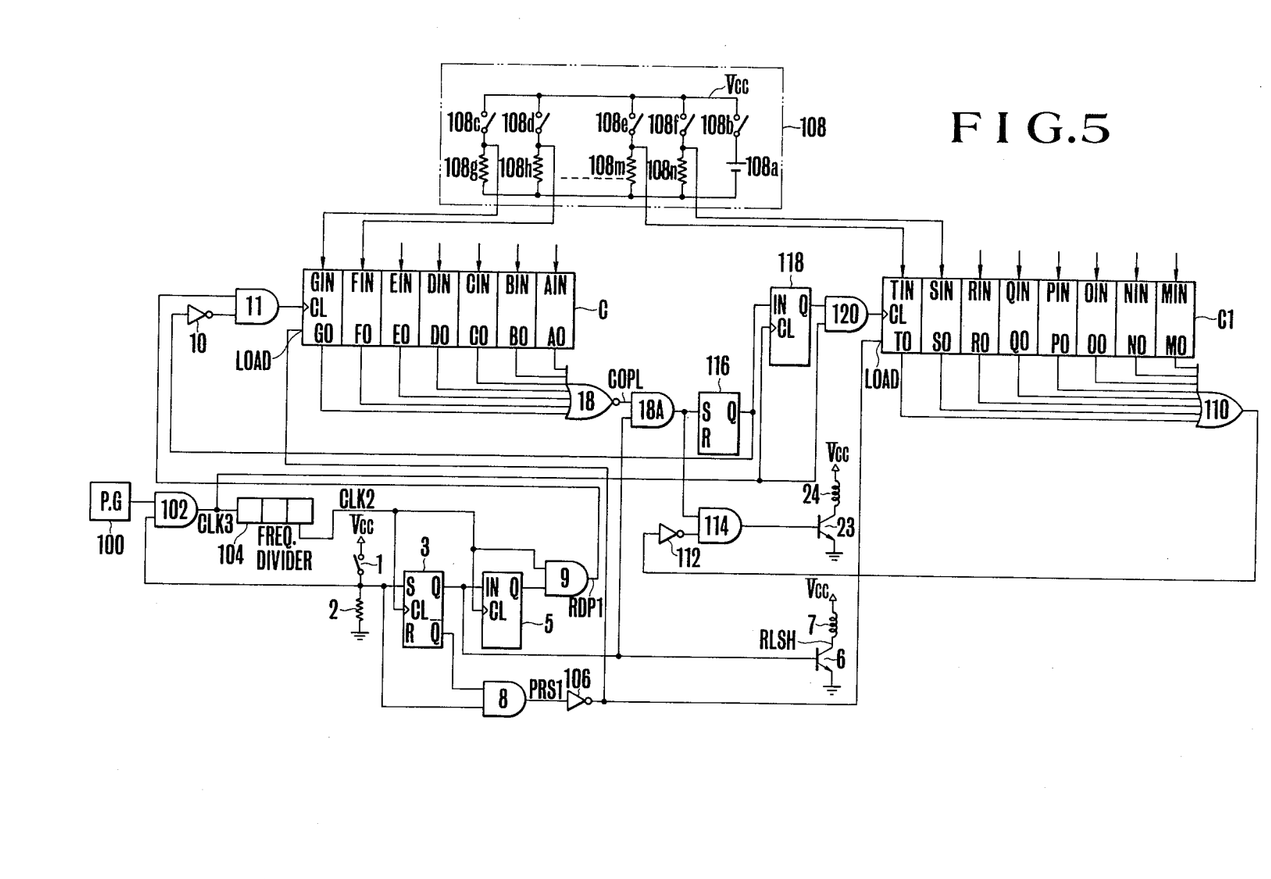
FIG. 5 shows the circuit diagram of a second embodiment of the present invention.

FIG. 5 shows the circuit diagram of the second embodiment of the present invention, where a=8, that is, the exposure time is controlled with the step of $\frac{1}{8}$. In FIG. 5, 100 is a pulse generator for producing a train of pulses with a period of Tst/8, having an output connected to the input terminal of the frequency divider 104 through an AND gate 102. The frequency divider 104 serves to multiply the frequency number of the pulse train produced with the pulse generator 100 with $\frac{1}{8}$, namely, the frequency (Tst/8) of the pulse train produced with the generator 100 with 8.

Element 106 is the inverter connected to the preset enable terminal LOAD of the counter which is composed in the same way as in the case of counter C in FIG. 1 and the preset enable terminal LOAD of the counter $C_1$, to be explained later. Element 108 is the exposure time setting device, having a power source 108a, a normally-open type power switch 108 and a number of the switches 108c–108f for the exposure time information setting. One terminal of the resistor 108g is connected to the preset terminal of GIN, which is the MSB of the counter C, while one terminal of the resistor 108h is connected to the preset terminal of the bit FIN of the counter C. The preset terminals and the switches, as well as the resistances to be connected to the bits EIN–AIN of the counter C, as omitted in the drawing for the sake of simplicity. One terminal of the resistor 108e is connected to the preset terminal of TIN, which is the MSB of the counter $C_1$, while one end of the resistor 108f is connected to the preset terminal of the bit SIN of the counter $C_1$. The switches, as well as the resistances to be connected to the preset terminals of the bit RIN-MIN of the counter $C_1$, are omitted in the drawing for the sake of simplicity. The above-mentioned counter $C_1$ is an 8 bit presettable counter, and is composed of, for example, a conventional up and down counter. Element 110 is an OR gate having an input terminal connected to the output terminals MO-TO of the counter $C_1$. Element 112 is an inverter; element 114 is an AND gate connected to the base of the shutter trailing curtain control transistor 23 in FIG. 1; element 116 is the R-SFF for storing the coincidence signal COPL and prohibiting the delivery of the reading out pulses to the counter C; and element 118 is the DFF having an input terminal IN connected to the output terminal Q of FF116 and the clock input CL connected to the output terminal of the AND gate 102. The output terminal Q of DFF118 is connected to the count input terminal CL of the counter $C_1$ through the AND gate 120. In the first embodiment, a multiplication circuit for multiplying $2^n$ of the shutter speed T with b of the exposure time T, that is, a circuit with multiplication factor 1 is provided, while in the second embodiment, an exposure time setting device 108 for producing the product of $2^n$ of the exposure time T with b of the exposure time T is provided, eliminating the multiplication circuit as mentioned above.

Below, the operation of the second embodiment will be explained. Now, assume that b=0, while the exposure time value $T = T_{st} \cdot 2^n$. When the release button (not shown in the drawing) of the camera is pushed down, the content of the flip-flops and the counters are reset. When the release button is further pushed down and the switch 1 is closed, as is explained in the case of the first embodiment, the output of the AND gate 8 becomes a "1", whereby a "0" is applied to the LOAD terminal LOAD of the counters C and $C_1$. Thus, a digital signal corresponding to the exposure time to be reproduced is preset in the counters C and $C_1$.

Figure 6:
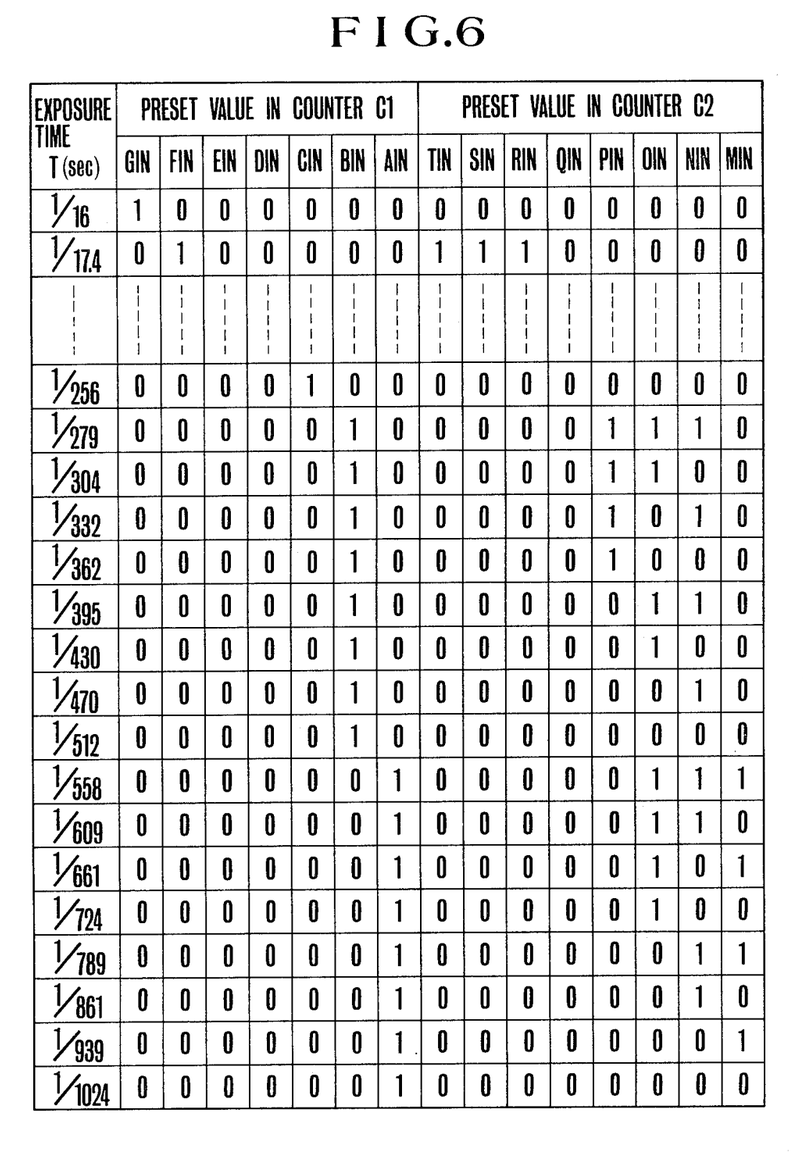
FIG. 6 shows the correspondence of each shutter time to the contents of the counters C and C1 shown in FIG. 5.

Now, assume that the exposure time set in the exposure time setting device 108 is 1/1024 (seconds). (0000001) is preset in the counter C while (00000000) is preset in the counter $C_1$ as is shown in FIG. 6.

After the exposure time has been preset as is explained above, the frequency trigger 104 is triggered by means of the clock pulse CLK3 produced with PG 100 in such a manner that the frequency divider 104 starts to produce the clock pulses CLK2, which brings the transistor 6 into the conductive state in the same way as in the case of the first embodiment so as to allow the start of the shutter leading curtain and start the exposure to the film (not shown in the drawing).

Further, when FF3 is inverted by means of CLK2, the output of the AND gate 8 becomes "0", so that at the same time as the start of the shutter leading curtain, the exposure time value has been preset in the counters C and $C_1$.

When CLK2 is again inverted from "0" to "1" after lapse of 1/1024 (seconds) after the shutter opening, DFF5 is triggered so that the level at the output terminal Q of DFF5 is inverted from a "0" to a "1" in the same way as in the first embodiment so that the level at the output terminal of the AND gate 9 becomes "1".

On the other hand, because at this time the level at the output terminal Q of FF116 is a "0", while the inverter 10 provides a "1", the output of the AND gate 11 becomes a "1" in synchronization of the rising of the signal RDP1, by which action the reading out signal is applied to the counter C. Thus, all the levels at the output terminals GO-AO of the counter becomes "0", whereby the output of the NOR gate 18 becomes "1" in the same way as in the first embodiment. Thus, the level at the first input terminal of the AND gate 114 becomes a "1" through the AND gate 18A. The level at the second input terminal of the AND gate 114 is a "1", because, as mentioned above, all the levels at the output terminals of the counter $C_1$ are "0". Thus, the AND gate 114 produces a "1" in sychronization with the signal COPL produced by the NOR gate 18 when the counter C has counted one pulse, while the transistor 23 is inverted into the switched-on state. Thus, the shutter trailing curtain starts to run in the same way as in the first embodiment so as to complete the exposure. That is, the exposure time of 1/1024 (seconds) is reproduced.

Below, the case where the exposure time b to be reproduced is not zero (b≠0), for example b=2, while n=0, will be explained in accordance with FIG. 6, i.e., the case where the shutter time is 1/861 (seconds).

When, in the same way as in the above-mentioned case, the release button is pushed down to the second stroke and the preset signal PRS1 is produced with the AND gate 8, a digital signal corresponding to the exposure time value to be reproduced is preset in the counters C and $C_1$. Because, at this time, the exposure time to be reproduced is 1/861 (seconds) as is mentioned above, (0000001) is preset in the counter C, while (00000010) is preset in the counter $C_1$ as will be clear from FIG. 6. When, then, the frequency divider 104 is triggered by means of CLK with a period of 1/8192 (seconds) produced by PG 100 and CLK2 is inverted from a "0" to a "1", the shutter leading curtain starts to run and the counters C and $C_1$ have been preset. When the signal CLK2 is inverted from a "0" to a "1" after lapse of 1/1024 (seconds) after the start of the shutter leading curtain, the signal RDP1 of the AND gate 9 is inverted from a "0" to a "1".

Because, at this time FF116 is in the reset state while the output of the inverter 10 is "1", the AND gate 11 produces a "1" in synchronization with the "1" from the AND gate 9 so that the counter C counts down to (0000000). Consequently, the NOR gate 18 produces a "1", while the AND gate 18A also produces a "1". Accordingly, because the output of the counter $C_1$ is (00000010), while the inverter 112 produces a "0", the output of the AND gate 114 does not become "1" and, therefore, the shutter trailing curtain does not start to run at this time.

On the other hand, when the output of the AND gate 18A becomes a "1", FF116 is set so as to deliver a "1" from the output terminal Q, while the output of the inverter 10 becomes "0" so as to close the AND gate 11. Thus, all the levels at the output terminals of the counter C remain "0", while the AND gate 18A continues to produce a "1". Further, because FF116 is set as mentioned above, a "1" is applied to the input terminal of DFF118. Thus, when CLK3 is inverted from a "0" to a "1" after the signal COPL has been produced, that is, after lapse of 1/1024+1/8192 (seconds) after the start of the shutter leading curtain, the level at the output terminal Q of FF118 becomes a "1", while the output of the AND gate 120 is inverted from a "0" to a "1".

When the output of the gate 120 is inverted from a "0" to a "1", the content of the counter $C_1$ is inverted from (00000010) to (00000001). Further, when the signal CLK3 is again inverted from a "0" to a "1", the signal CLK3 is applied to the input terminal CL of the down counter $C_1$ through the AND gate 120, so that the content of the counter $C_1$ is converted to (00000000). That is, all the levels at the output terminals of the counter $C_1$ become "0" after the lapse 1/819 (seconds) of time (=1/1024+1/8192+1/8192 (seconds), while the level at the output terminal of the inverter 112 become a "1" so that the output of the AND gate 114 becomes a "1", the transistor 23 is brought into the conductive state and the conventional shutter trailing curtain (not shown in the drawing) starts to run to complete the exposure. Thus, although the exposure time reproduced in this way is different from the preset exposure time 1/861 (seconds), the difference is as small as 5.1(%) so that the effect, in practice, is inconsequential.

As explained above, the device in accordance with the present invention is designed so that principally the counting is made twice by means of pulse trains with two kinds of frequencies to obtain the sum of the twice-counted time in order to reproduce the exposure time by making use of the time of the sum. Thus, it is not, as in the case of the conventional arrangements, necessary to provide a rate multiplier, decoder or a number of oscillators. Accordingly, the circuits can be designed in a simple but effective way.

While the foregoing description and drawings represent the preferred embodiments of the present invention, it will be obvious to those skilled in the art that various changes and modifications may be made therein without departing from the true spirit and scope of the present invention.

What is claimed is:

1. An automatic exposure time control apparatus for a camera, wherein the exposure time has an integral part and a decimal part, comprising:
    (a) first pulse generating means for producing a first train of pulses having a certain determined frequency;
    (b) second pulse generating means for producing a second train of pulses having a certain determined frequency relative to the content of the decimal part of the exposure time;
    (c) pulse counting means for counting pulses;
    (d) means for supplying the first pulse train to the pulse counting means and the second pulse train to the pulse counting means at a subsequent time interval;
    (e) means for initiating counting of pulses from the first pulse train by the pulse counting means when the exposure is initiated; and
    (f) control means for terminating the exposure when the pulse counting means has counted $2^n$ pulses relative to the content of the integral part of the exposure time coming from the first pulse generating means and $2^n \cdot b$ pulses relative to the content of the decimal part of the exposure time coming from the second pulse generating means at the subsequent time interval.

2. An automatic exposure time control apparatus according to claim 1, wherein the pulse counting means includes a down counter having input connected to the pulse supplying means.

3. An automatic exposure time control apparatus according to claim 1, wherein the control means includes detecting means connected to the output of the pulse counting means for producing a coincidence signal when the content of the pulse counting means has reached a predetermined value.

4. An automatic exposure time control apparatus according to claim 3, wherein the detecting means includes a NOR gate.

5. An automatic exposure time control apparatus for a camera, wherein the exposure time has an integral part and a decimal part, comprising:
    (a) first pulse generating means for producing a first train of pulses having a certain determined frequency;
    (b) second pulse generating means for producing a second train of pulses with a certain determined frequency (Tst/a) relative to the content of the decimal part of the exposure time;
    (c) first pulse counting means for counting a number of pulses from the first pulse generating means;
    (d) first means for enabling counting of first pulse counting means to begin operation when exposure is initiated;
    (e) first detecting means connected to the output of the first pulse counting means in order to produce a first signal, when the first pulse counting means has counted a number of pulses ($2^n$) relative to the content of the integral part of the exposure time;
    (f) second pulse counting means for initiating counting of pulses from the second pulse generating means in response to the first signal; and
    (g) second detecting means for terminating the exposure, when the second pulse counting means has counted a number of pulses relative to the content of the decimal part of the exposure time.

6. An automatic exposure time control apparatus according to claim 5, wherein the first pulse generating means includes a frequency divider to divide a frequency of the second pulse train.

7. An automatic exposure time control apparatus according to claim 5, wherein the first pulse counting means includes a down counter having an input terminal connected to the first pulse generating means.

8. An automatic exposure time control apparatus according to claim 5, wherein the first means includes a gate for initiating transmission of pulses from the first pulse generating means to the input of the first pulse counting means when exposure is initiated.

9. An automatic exposure time control apparatus according to claim 5, wherein the first detecting means includes a NOR gate.

10. An automatic exposure time control apparatus according to claim 5, wherein the second pulse counting means includes a down counter.

11. An automatic exposure time control apparatus according to claim 5, wherein the second detecting means includes an OR gate.

12. An automatic exposure time control apparatus according to claim 5, further comprising a means for compulsorily terminating the exposure in response to the first signal when the content of the decimal part of the exposure time does not exist (2b/a=1).

13. An automatic exposure time control apparatus for a camera, wherein the exposure time has an integral part and a decimal part, comprising:
    (a) first pulse generating means for producing a first pulse signal with a certain determined frequency;
    (b) second pulse generating means for producing a second pulse signal relative to the content of the decimal part of the exposure time;
    (c) pulse counting means for counting the number of the first pulse signals and that of the second pulse signals;

(d) first means for enabling the counting of the pulse counting means to begin operation when exposure is initiated; and (e) means for terminating the exposure after the lapse of the sum of the time interval during which the pulse counting means has counted $2^n$ pulses from the first pulse generating means and the time interval during which the pulse counting means has counted a number relative to the content of the decimal part of the exposure time of pulses from the second pulse generating means.

14. An automatic exposure time control apparatus according to claim 13, further comprising a means for compulsorily terminating the exposure after the lapse of the time interval during which the pulse counting means has counted $2^n$ pulses from the first pulse generating means.

15. An automatic exposure time control apparatus for a camera producing an exposure time value $T = Tst \cdot 2^n \cdot 2^{b/a}$ (where Tst is the shortest exposure time, $2^n$ is the content of the integral part of the exposure time, $2^{b/a}$ is the content of the decimal part of the exposure time, n and b are zero or natural numbers and a is a natural number), comprising:

(a) first pulse generating means for producing pulses with the frequency of Tst;

(b) second pulse generating means for producing pulses with the frequency of Tst/a;

(c) pulse counting means for counting the number of pulses from the first pulse generating means and that of the pulses from the second pulse generating means;

(d) first means for enabling the counting of the pulse counting means when the exposure is initiated; and (e) means for terminating the exposure after the lapse of the sum of the first time interval during which the pulse counting means has counted $2^n$ pulses from the first pulse generating means and the second time interval during which the pulse counting means has counted $2^n \cdot b$ pulses from the second pulse generating means.

16. An automatic exposure time control apparatus according to claim 15, further comprising a means for compulsorily terminating the exposure after the lapse of the time interval during which the pulse counting means has counted $2^n$ pulses from the first pulse generating means.

* * * * *